UNITED STATES PATENT OFFICE.

GEORGE HILLARD BENJAMIN, OF NEW YORK, N. Y.

METHOD OF DRYING HOPS.

1,226,052.  Specification of Letters Patent.  Patented May 15, 1917.

No Drawing.   Application filed September 23, 1914. Serial No. 863,101.

*To all whom it may concern:*

Be it known that I, GEORGE HILLARD BENJAMIN, a citizen of the United States, residing at New York city, in the county and State of New York, have invented a certain new and Improved Method of Drying Hops, of which the following is a specification.

My invention consists in an improved method of drying hops and the object of my invention is the production of hops in a state in which they may be stored for indefinite length of time without deterioration of the lupulin contents. Hops, when fresh picked, contain a large amount of water. A portion of this water is on the external surface of the leaves, and a portion contained within the cell walls of the different parts of the hops. Hops also carry an active enzym, which, acting in conjunction with the water (which is sufficient in amount) produces a rapid fermentation, gives rise to heat, and effects reactions which rapidly destroy the lupulin.

The method now commonly employed for treating hops, consists in either drying them by exposure to air or to heat, and subsequently to the action of sulfurous acid gas. In practice it has been demonstrated that such methods of treatment did not prevent rapid deterioration which is assumed to be due either to the activity of the enzym present (fermentation) or to the oxidizing action of the atmosphere which converts the lupulin into an acid. Efforts have been made to stop the deterioration, with some slight success, by placing the hops in cold storage. The experiments which have been made by the Government bureau tests illustrate that while cold storage retards the destruction of the lupulin, it does not stop it.

My invention is based upon the observed fact that if the moisture contents of the hops is reduced to an amount sufficient to prevent the action of the enzym, there will be no fermentation of the hops, and hence, no heating or other action which acts to destroy the lupulin.

It is a well recognized fact that every particular enzym requires a definite amount of moisture to render it active, and that when the moisture contents is reduced below such amount, which, generally speaking is from 5% to 20% of the original moisture contents, the enzym will cease to be active, and produce no destructive effect.

To carry my invention into effect, I may proceed in the following manner:

The hops, as they come from the vines, are introduced into a dehydrating apparatus of any suitable description, such for instance as described in my prior application, Serial No. 854,598, filed August 1st, 1914. The hops may be placed upon perforated trays, in masses varying in depth from three to five inches, or introduced into revolving drums, whereby the hops are given motion.

After the hops are introduced into the dehydrating apparatus, they are therein subjected, first to the action of large volumes of heated air, preferably dry air, until the moisture contents of the hops has been reduced to a definite amount, *i. e.*, to such an amount as will maintain the cell membranes of the different parts of the hop plant in a condition to permit endosmosis of water at some subsequent period, but insufficient to coact with the enzym carried by the hops to produce fermentation, mold, or conversion into an acid when stored; and second, to the action of an increased temperature, sufficient in amount to develop the active principle of the hop, *i. e.*, lupulin, but not sufficient to perceptibly decrease the amount of moisture left after the first treatment, or to physically affect the structure of the various parts of the hops, or produce any particular chemical change in the bodies incorporated in the hops.

In practice I prefer to subject the hops to the action of currents of air of large volume, from which the major portion of the moisture has been removed, and heated to approximately 120° Fahrenheit. The action of the air currents should be maintained anywhere from one to three hours, depending upon the original moisture contained in the hops. After the temperature stated has been continued for the required time, the temperature is raised to between 140–165°, and continued for from two to five hours, depending upon the percentage of moisture remaining in the body.

It has been developed as a practical fact, that in the treatment of hops, as well as other bodies, if the body is subjected to a temperature of say 120° Fahrenheit, there will be an exosmotic flow of moisture from within the cell structures outward, for a definite length of time, and that the continued exhibition of such temperature, after such length of time, will effect no further exudation; but if the temperature is raised, the exosmotic action will again start and continue for a definite length of time. Thus, in order to obtain the required exosmotic exudation without destruction of the body acted on, that is, without rupturing its cell walls, or without producing chemical changes, it is advisable to start exosmotic action at a low temperature (for instance 120° Fahrenheit) continuing that temperature for a certain time, and then raising the temperature and continuing for a certain time; then note the remaining moisture, and if in excess of that which it is desired the finished product shall have, again raise the temperature and continue until the required amount of moisture only is present.

In determining the temperatures to be employed, it is necessary to take into consideration the temperature point at which the essential oils or active principle will be volatilized or destroyed, and to keep the temperature below such point. I make the foregoing observation, as it is quite impossible to state definite temperatures which must be used, without a thorough examination of the character and condition, so far as moisture is concerned, of the particular body of hops to be treated; and this is true also of other vegetable bodies.

After the hops have been dehydrated, that is, after the moisture has been reduced to the amount stated, I may subject them to the action of a temperature of approximately 170° Fahrenheit, for from thirty minutes to one hour. The temperature is preferably applied by direct heat; that is, by radiated heat from electric coils or otherwise, rather than by the step described, i. e., through the instrumentality of large moving, heated and dried air currents. This heating step is not essential with the majority of hops to be treated, and is only advisable where the hops have not been fully developed, owing to wet weather, etc., the action of the heat being apparently to develop the lupulin.

In practice I may also subject the hops to the action of sulfurous acid gas, or other gas, which will have a similar effect. It is not known at the present time, exactly what is the effect of the sulfurous acid gas upon the hops. It is known that its use retards the oxidation of the lupulin, and that it effects a change of color of the hops.

In practice, with the carrying into effect of the method herein described, the action of the sulfurous acid gas seems to be merely to effect the color of the hops and thereby put the hops into a condition more favorable for commercial sale, it being the practice to judge hops by their color rather than by a chemical examination to determine their lupulin contents. I merely mention the use of sulfurous acid gas, but as in the case of exposure of the hops to high temperature, I do not consider it essential although advisable.

I am aware that it has heretofore been suggested to subject vegetable materials to the action of dehydrated and heated air currents where the temperature is limited to 170° Fahrenheit. My method of operation, however, differs from such known method, in that practice has demonstrated that if hops are subjected to a temperature of 170° Fahrenheit, and the temperature continued until the hops are finally dried, while the cell membranes will not be ruptured or any chemical change effected other than coagulation of the albumen present, the cell membranes will be dried to such an extent and the oil constituents contained within the cell walls so acted upon, that the cell walls will not permit subsequent endosmosis of water, and the oils will be converted into resins which are not subsequently soluble; whereas, in my improved system, the treatment leaves the cell membranes in a condition for endosmotric action, and the oils are not transformed into resins. This it will be understood from the foregoing description, is brought about by subjecting the material to the influence of air currents heated and applied for only such length of time as is necessary to exosmotically remove the necessary amount of water, but leave present in the cell walls and membranes, sufficient water to bring about the endosmetric effects necessary. But in other words, the treatment heretofore suggested has produced desiccation of the material treated, which involves extraction of all of the water; whereas my improved system produces dehydration of the material treated, which involves extraction of all but a certain definite part of the water. A desiccated body can never be returned to its original condition, i. e., its fresh condition, whereas a dehydrated body may, by the addition of warm water. With a desiccated body the oils are subject to rapid oxidation; with a dehydrated body the oils are protected within what may be termed the moist cell membranes, against oxidation, the amount of water in a dehydrated body being insufficient to coact with the enzym to produce fermentation or mold.

I wish it understood that I do not limit myself to the precise temperatures herein specified, as it will be obvious, as above stated, that the temperatures and the time of applying the temperatures will depend largely upon the characteristics, so far as development, amount of contained water, etc., etc., of the body treated.

Having thus described my invention, I claim:

1. The method of drying hops, which consists in subjecting them to the action of large volumes of dry air heated first to approximately 120° temperature, and then to successively increasing temperatures until such portion of the moisture remaining in the hops is sufficient to maintain the cell membrane of the hops in a condition to permit endosmosis of water at some subsequent period, but insufficient to coact with the living enzyms carried by the hops to produce fermentation or mold, the enzyms not being destroyed by the temperature employed.

2. The method of drying hops, which consists in subjecting hops to the action of large volumes of dry air heated to approximately 120° temperature for from one to two hours; then to the action of large bodies of air heated to between 140-165° temperature for from two to five hours, until such time as the amount of moisture left in the body will be insufficient to effect fermentation or the production of mold with the enzym present.

3. The method of drying hops, which consists in subjecting hops to the action of large volumes of dry air heated to approximately 120° temperature for from one to two hours; then to the action of large bodies of air heated to between 140-165° temperature for from two to five hours, until such time as the amount of moisture left in the body will be insufficient to effect fermentation or the production of mold with the enzym present, and then to the action of a temperature of approximately 170° Fahrenheit for from thirty minutes to one hour.

4. The method of drying hops, which consists in subjecting hops to the action of large volumes of dry air heated to approximately 120° temperature for from one to two hours; then to the action of large bodies of air heated to between 140-165° temperature for from two to five hours, until such time as the amount of moisture left in the body will be insufficient to effect fermentation or the production of mold with the enzym present, then to the action of a temperature of approximately 170° Fahrenheit for from thirty minutes to one hour and then to the action of sulfurous acid gas for from fifteen minutes to half an hour.

5. The method of drying hops herein described, which consists in extracting all of the water present by the action of dehydrated hot air, and without destroying the enzyms present, except such an amount as is necessary to maintain the capacity of the cell membranes to bring about endosmosis when the hops are subsequently immersed in water and to protect the lupulin within the cell walls from the oxidizing action of the air or external moisture, but such water insufficient in amount to coact with the enzyms present to produce fermentation or mold.

6. A step in the process of drying hops which consists in subjecting the hops, after they have been subjected to a dehydrating treatment whereby the water constituent is reduced below the point necessary to effect fermentation or other action with the active enzym present, to the action of a high temperature for sufficient length of time to develop the aromatic qualities but produce no further extraction of water.

7. As a new article of manufacture, a hop containing all of the original constituents of the hop, all its normal enzyms in an active condition, a definite amount of water, but insufficient in amount to coact with the enzyms to produce fermentation or mold, and having as its characteristic that the hop, when immersed in water, will endosmotically cause water to enter its cells through the unbroken cell walls and coact with the active enzyms to set up fermentation.

8. The method of drying hops, which consists in subjecting hops to the action of large volumes of dry air heated to approximately 120° temperature and then to successively increasing temperatures, and continuing the action of the air until all of the water carried by the hops is removed by exudation from the hops and absorption by the air, excepting approximately 5% of the normally contained water and without affecting its normal enzyms.

9. As a new article of manufacture, a hop having all its enzyms unaffected and all water removed excepting such an amount as is insufficient to coact with the enzyms to set up fermentation or mold, but sufficient to maintain the cell walls of the hop in a condition to permit of the passage of a fluid through them, and said hop adapted when placed in a fluid, to absorb the fluid and cause such fluid to coact with the enzyms to produce a change in the hop.

In testimony whereof, I affix my signature, in the presence of two witnesses.

GEORGE HILLARD BENJAMIN.

Witnesses:
    HELEN E. KOELSCH,
    LESTER BEARDSLEY.